US009022853B2

(12) United States Patent
Baerlocher et al.

(10) Patent No.: US 9,022,853 B2
(45) Date of Patent: *May 5, 2015

(54) GAMING DEVICE HAVING BONUS GAME DEPENDENT UPON VARIABLE WAGER COMPONENT SELECTION

(71) Applicant: IGT, Reno, NV (US)

(72) Inventors: Anthony J. Baerlocher, Henderson, NV (US); Karen M. Kendall, Syndey (AU)

(73) Assignee: IGT, Las Vegas, NV (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/848,497

(22) Filed: Mar. 21, 2013

(65) Prior Publication Data

US 2013/0225251 A1 Aug. 29, 2013

Related U.S. Application Data

(63) Continuation of application No. 12/955,311, filed on Nov. 29, 2010, now Pat. No. 8,425,305, which is a continuation of application No. 10/660,077, filed on Sep. 10, 2003, now Pat. No. 7,867,077.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/3244* (2013.01); *G07F 17/32* (2013.01)

(58) Field of Classification Search

USPC ................................................ 463/20, 25–28

See application file for complete search history.

(56) References Cited

U.S. PATENT DOCUMENTS

| | | | |
|---|---|---|---|
| 4,624,459 | A | 11/1986 | Kaufman |
| 4,669,731 | A | 6/1987 | Clarke |
| 4,695,053 | A | 9/1987 | Vazquez, Jr. et al. |
| 4,856,787 | A | 8/1989 | Itkis |
| 4,991,848 | A | 2/1991 | Greenwood et al. |
| 5,116,055 | A | 5/1992 | Tracy |

(Continued)

FOREIGN PATENT DOCUMENTS

| | | |
|---|---|---|
| AU | 199717601 | 2/1997 |
| AU | 199917318 | 2/1999 |

(Continued)

OTHER PUBLICATIONS

3RV—Jackpot Party advertisement written by WMS Gaming, Inc., published Aug. 8, 2002.

(Continued)

*Primary Examiner* — Kevin Y Kim

(74) *Attorney, Agent, or Firm* — Neal, Gerber & Eisenberg LLP

(57) ABSTRACT

A primary and secondary game for a wagering gaming machine. In one embodiment, the number of lines wagered or a slot machine makes the player eligible for a bonus game, and a wager made per payline effects how many moves or positions on a meter the player advances upon achieving the bonus triggering symbol or combination of symbols. When the player advances the meter to the end, the gaming device displays a payout event. The payout event can be any type of bonus gaming event that potentially provides an award to the player.

20 Claims, 9 Drawing Sheets

(56) References Cited

U.S. PATENT DOCUMENTS

| | | | |
|---|---|---|---|
| 5,308,065 | A | 5/1994 | Bridgeman et al. |
| 5,332,228 | A | 7/1994 | Schultz |
| 5,344,144 | A | 9/1994 | Canon |
| 5,377,973 | A | 1/1995 | Jones et al. |
| 5,397,125 | A | 3/1995 | Adams |
| 5,423,539 | A | 6/1995 | Nagao |
| 5,431,408 | A | 7/1995 | Adams |
| 5,511,781 | A | 4/1996 | Wood et al. |
| 5,584,764 | A | 12/1996 | Inoure |
| 5,611,535 | A | 3/1997 | Tiberio |
| 5,645,485 | A | 7/1997 | Clapper, Jr. |
| 5,722,891 | A | 3/1998 | Inoue |
| 5,769,716 | A | 6/1998 | Saffari et al. |
| 5,817,172 | A | 10/1998 | Yamada et al. |
| 5,823,873 | A | 10/1998 | Moody |
| 5,823,874 | A | 10/1998 | Adams |
| 5,833,537 | A | 11/1998 | Barrie |
| 5,833,538 | A | 11/1998 | Weiss |
| 5,851,148 | A | 12/1998 | Brune et al. |
| 5,910,048 | A | 6/1999 | Feinberg |
| 5,967,893 | A | 10/1999 | Lawrence et al. |
| 5,993,316 | A | 11/1999 | Coyle et al. |
| 6,004,207 | A | 12/1999 | Wilson, Jr. et al. |
| 6,012,983 | A | 1/2000 | Walker et al. |
| 6,059,658 | A | 5/2000 | Magano et al. |
| 6,062,980 | A | 5/2000 | Luciamo |
| 6,089,976 | A | 7/2000 | Schneider et al. |
| 6,089,977 | A | 7/2000 | Bennett |
| 6,093,102 | A | 7/2000 | Bennett |
| 6,102,400 | A | 8/2000 | Scott et al. |
| 6,106,393 | A | 8/2000 | Sunaga et al. |
| 6,110,041 | A | 8/2000 | Walker et al. |
| 6,113,098 | A | 9/2000 | Adams |
| 6,120,031 | A | 9/2000 | Adams |
| 6,126,542 | A | 10/2000 | Fier |
| 6,155,925 | A | 12/2000 | Giobbi et al. |
| 6,158,741 | A | 12/2000 | Koelling |
| 6,159,095 | A | 12/2000 | Frohm et al. |
| 6,159,097 | A | 12/2000 | Gura |
| 6,159,098 | A | 12/2000 | Slomiany et al. |
| 6,168,522 | B1 | 1/2001 | Walker et al. |
| 6,168,523 | B1 | 1/2001 | Piechowiak et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,203,429 | B1 | 3/2001 | Demar et al. |
| 6,210,277 | B1 | 4/2001 | Stefan |
| 6,217,448 | B1 | 4/2001 | Olsen |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,244,957 | B1 | 6/2001 | Walker et al. |
| 6,251,013 | B1 | 6/2001 | Bennett |
| 6,254,482 | B1 | 7/2001 | Walker et al. |
| 6,270,409 | B1 | 8/2001 | Shuster |
| 6,299,165 | B1 | 10/2001 | Nagano |
| 6,299,170 | B1 | 10/2001 | Yoseloff |
| 6,302,398 | B1 | 10/2001 | Vecchio |
| 6,302,791 | B1 | 10/2001 | Frohm et al. |
| 6,309,299 | B1 | 10/2001 | Weiss |
| 6,311,976 | B1 | 11/2001 | Yoseloff et al. |
| 6,312,331 | B1 | 11/2001 | Tamaki |
| 6,315,660 | B1 | 11/2001 | DeMar et al. |
| 6,315,662 | B1 | 11/2001 | Jorasch et al. |
| 6,322,078 | B1 | 11/2001 | Adams |
| 6,336,862 | B1 | 1/2002 | Byrne |
| 6,358,144 | B1 | 3/2002 | Kadlic et al. |
| 6,419,579 | B1 | 7/2002 | Bennett |
| 6,428,412 | B1 | 8/2002 | Anderson et al. |
| 6,439,993 | B1 | 8/2002 | O'Halloran |
| 6,439,995 | B1 | 8/2002 | Hughs-Baird et al. |
| 6,454,266 | B1 | 9/2002 | Breeding et al. |
| 6,491,584 | B2 | 12/2002 | Graham et al. |
| 6,494,454 | B2 | 12/2002 | Adams |
| 6,599,193 | B2 | 7/2003 | Baerlocher et al. |
| 6,604,740 | B1 | 8/2003 | Singer et al. |
| 6,682,073 | B2 | 1/2004 | Bryant et al. |
| 2002/0045474 | A1 | 4/2002 | Singer et al. |
| 2002/0155873 | A1 | 10/2002 | Berman et al. |
| 2003/0027623 | A1 | 2/2003 | Rose |
| 2003/0027638 | A1 | 2/2003 | Schneider et al. |
| 2003/0036419 | A1 | 2/2003 | Baerlocher et al. |
| 2003/0036422 | A1 | 2/2003 | Baerlocher et al. |
| 2003/0036424 | A1 | 2/2003 | Baerlocher |
| 2003/0054873 | A1 | 3/2003 | Peterson |
| 2003/0060266 | A1 | 3/2003 | Baerlocher |
| 2003/0069056 | A1 | 4/2003 | Cormack et al. |
| 2003/0236116 | A1 | 12/2003 | Marks et al. |
| 2004/0082378 | A1 | 4/2004 | Peterson et al. |

FOREIGN PATENT DOCUMENTS

| | | |
|---|---|---|
| EP | 0 984 408 | 3/2000 |
| WO | WO 85/00910 | 2/1985 |
| WO | WO 97/32285 | 9/1997 |
| WO | WO 00/66235 | 11/2000 |
| WO | WO 00/76606 | 12/2000 |
| WO | WO2005/083599 | 9/2005 |

OTHER PUBLICATIONS

Bally Gaming Systems Fall 2000 brochure written by Bally Gaming, published in 2000.

The Basics of Winning Video Poker written by J. Edward Allen, published in 1990.

Black Swan Wagering advertisement and Paytable written by IGT, published prior to 2001.

Break the Spell advertisement written by Atronic Casino Technology, published in 1999.

Break the Spell Atronic Web Page—www.atronic.com/products/videoslots/brealcthespell/content.shtml, printed on Jan. 15, 2001.

Cash Chameleon article written by Strictly Slots/Aristocrat Leisure Industries, PTY Ltd., published in Apr. 2001.

Cossack Dancer advertisement written by Olympic Video Gaming, published prior to 2002.

Deep Pockets Video Slots advertisement written by IGT, published in 2002.

Deep Pockets advertisement published in Quest 2002, in 2002.

Deep Pockets article written by Strictly Slots, published in Mar. 2002.

Description of Enchanted Forest Game distributed by Aristocrat in 1994.

Description of Symbol Feature in Australian UFO Gaming Machine distributed by Barcrest Ltd. in 1995.

Enchanted Unicorn advertisement written by IGT, published in 2001.

Fishin' Buddies article written by Strictly Slots, published in Apr. 2001.

Jackpot Party brochures and articles written by WMS Gaming, Inc., published in Mar. 1998.

Jackpot Party Video 9-Line advertisement written by WMS Gaming, Inc., published prior to Sep. 11, 2003.

Jackpot Party advertisement on website page http://www.winsgaming.com/products/slot/jpp/index.hunl, printed on Mar. 21, 2001.

Jazzy Jackpots article written by Strictly Slots, published Mar. 2001.

Loco Loot Article written by Strictly Slots, published in May 2002.

Neon Nights advertisement written by IGT, published in 2000.

Neon Nights Web Page—http://www.igt.com/games/new_games/neon_nights.html, printed on Feb. 7, 2001.

Penguin Pays advertisment written by Aristocrat, published in 1998.

We Make Gaming Fun! advertisement written by WMS Gaming Inc., published prior to Sep. 11, 2003.

Wild Streak Article written by Strictly Slots, published Mar. 2001.

| Bet Per Line | Positions Advanced |
|---|---|
| 1 | 1 |
| 2 | 2 |
| 3 | 3 |
| 4 | 4 |
| 5 | 5 |

| No. of Wheels Wild | Percentage |
|---|---|
| 1 | 40% |
| 2 | 30% |
| 3 | 20% |
| 4 | 10% |

GAMING DEVICE HAVING BONUS GAME DEPENDENT UPON VARIABLE WAGER COMPONENT SELECTION

PRIORITY CLAIM

This application is a continuation of, and claims priority to and the benefit of, U.S. patent application Ser. No. 12/955,311, filed on Nov. 29, 2010, which is a continuation of, and claims priority to and the benefit of, U.S. patent application Ser. No. 10/660,077, filed on Sep. 10, 2003, which issued as U.S. Pat. No. 7,867,077 on Jan. 11, 2011, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

The present invention relates to wagering games and gaming devices. More particularly, the present invention relates to a bonus game triggering event and a bonus game cooperating with same.

Gaming device manufacturers have long provided gaming machines and particularly slot machines employing a plurality of reels, wherein the reels each have a plurality of symbols. In those games, the player causes a number of reels to produce a random generation of a combination of symbols. If the generated combination, or a portion of the combination, matches one of a number of predetermined award producing or winning combinations, the player receives an award.

To increase player enjoyment and excitement, and to increase the popularity of the gaming machines, gaming device manufacturers constantly strive to provide players with new types of gaming machines that attract the player and keep the player entertained. One proven way manufacturers use to make their machines more popular is to increase the number and variety of winning combinations and provide more opportunities for the player to win. Providing more variety and opportunities holds the player's interest for a longer time and also enables the manufacturer to have a larger range of payouts for the winning combinations. The larger range increases the size of the largest possible payout of the gaming device. Large payouts tend to attract players.

One avenue that manufacturers have taken to provide more variety, opportunity, enjoyment and excitement has been to increase the number of paylines. Paylines are the lines of symbol positions or paystops that the machine analyzes to determine if the player has won an award. Original gaming machines had only one payline. Modern machines, sometimes called "line" machines, have multiple paylines that form combinations of reel symbols for the gaming device to analyze.

Machines having at least three reels and displaying at least three rows of symbols can also have diagonal paylines. Machines having five reels and displaying at least three rows have many possible paylines, wherein the only criterion is that each symbol of a payline must be adjacent to at least one other symbol of the payline. Consequently, certain known gaming machines can have twenty-five different paylines, wherein a player can make up to twenty-five different bets each time the player spins the reels.

Multiple paylines present multiple opportunities for the player to obtain a winning combination of symbols. Usually, players have to wager more to obtain the benefit of the multiple lines. Many games provide a bonus jackpot for playing the maximum number paylines ("max lines") and/or the maximum number of coins per payline ("max coins"). Many newer games that have bonus games also require that the player wager max lines or max credits to be eligible for or to qualify for the bonus game or a jackpot. Certain players, however, do not wish to wager an amount necessary to play max lines or max credits.

As bonus games, in particular, have become and are expected to continue to become more popular and more prevalent, they have taken and will continue to take up more of the overall payout percentage for the gaming device. That is, a game designer must account for the average bonus game payout and the percentage of the time that the player obtains this average payout in determining the overall payout percentage for the machine. It is not unreasonable for a bonus game to account for thirty percent of the total payout percentage. This number may also increase.

A player who does not wager enough to qualify for bonus game play therefore loses this potentially increasing slice of the payout percentage. Such players play the gaming machine at what is commonly termed the "base" payout percentage, which equals the total winning percentage less the payout percentage of the bonus game. Requiring max lines or max credits for the bonus rewards a higher payout percentage to a player making such a wager. A need therefore exists for a game scheme that enables game designers to provide a fun and valuable bonus game to the player, require that the player wager max lines or max credits to qualify for the bonus game and provide a desired but not excessive disparity in the payout percentage between eligible and non-eligible players.

One solution has been to provide a payout to the player who wagers less than max lines or max credits but achieves the symbol combination along an active payline that would otherwise trigger the bonus game. For example, if three cherries trigger the bonus game when the player wagers max lines, the game employing the known solution would pay a certain amount times the coins wagered when the player plays less than max lines. The amount is calculated in the following manner. If a bonus game, for example, pays out twenty coins or credits per coin wagered, on average, then the bonus triggering combination pays out preferably slightly less than twenty coins, e.g., eighteen coins, per coin wagered when less than all lines are wagered. In this way, the game adds a percentage, i.e., 90%, of the bonus game's contribution back to the overall payout percentage.

The problem inherent in that known solution is that wagering less than an paylines guarantees the above described payout, while many bonus games come with no such guarantee. Certain bonus games involve risk and chance and in many cases very high payouts associated with very low winning percentages. The player may therefore achieve a payout significantly less than average in the bonus game. In such a case, the player would have been better off to wager less than max credits or max lines. That creates a disincentive to play max coins or max lines to qualify for the bonus game, which in turn deprives the player of the enjoyment and excitement of playing such game.

If the game designer attempts to guarantee a certain payout percentage in the bonus game, e.g., sixteen coins per coin wagered, then the average payout for the bonus game rises, an even larger slice of the total payout percentage now comes from the bonus game, and the player not wagering max lines is again disadvantaged. Accordingly, another solution is needed.

SUMMARY

The present invention includes a wagering game and a gaming device employing same. The wagering game includes both a method and apparatus for triggering a bonus game from a base game as well as a method of playing a bonus sequence. As described in detail below, in a game where the players wager has at least two different components, a threshold amount needs to be wagered on a first of the components to be eligible for a primary bonus game play. In one embodiment, the bonus game is a persistence type of game, wherein a meter is incremented according to the second wager component or the amount wagered on the second wager component and does not reset upon a cash out by the player. In one embodiment, if the first component does not include the threshold amount, a second different bonus event is provided to the player. In one such embodiment, the second different bonus event has a lower expected average value than the primary bonus game. The present invention is operable with multiple types of base wagering games including, but not limited to, slot, poker, keno and blackjack.

The bonus triggering apparatus is operable with any suitable type of wagering game, wherein the wager includes multiple components. For example, in slot, a player's total wager is combination of the number of paylines that the player wagers on (i.e., the first component), as well as the wager per payline (i.e., the second component). In the present invention, the bonus game is only enabled when the player wagers at least a threshold amount on one of the component variables such as betting on all lines in a slot machine. That is, if the player does not select to wager on all of the paylines, the player is not eligible to play the bonus game when the bonus game triggering event occurs. In that case, the gaming device makes the player eligible for a secondary type of bonus award or a fixed or predetermined pay amount.

The number of lines wagered effects whether the player can enter or is eligible to enter the main or primary (i.e., a designated) bonus game of the present invention. The player however also has to achieve a particular outcome to trigger the bonus game. For example, in the game of slot, the player has to achieve a particular symbol or combination of symbols on the slot machine reels to enter the primary bonus game. Then, if the player has wagered on each of the available paylines, the player can play or advance to the bonus game.

In one embodiment, the bonus game includes a meter. The meter starts off at the initial position. When the player achieves a triggering symbol or symbol combination, the meter is incremented or decremented by a certain amount. In one embodiment, the amount of the increment is proportional to a second component wagered by the player. The second component operates with the first component to form an overall wager. For example, the second component in the game of slot is how many credits are wagered per payline. In that manner, each wager component has an effect on the bonus game played. In the slot example, the number of lines wagered makes the player eligible for the bonus game, and a wager per payline effects how many moves or positions on a meter the player advances upon achieving the bonus triggering symbol or combination of symbols.

When the player advances the meter to the end, the gaming device displays a payout event. The payout event can be any suitable type of bonus gaming event that potentially provides an award to the player. In one embodiment, the bonus payout event is a free spin of the reels provided to the player wherein at least one of the reels is totally wild. That is, each symbol on the reel is made to be a wild symbol. In a five reel slot game, the present invention makes one to four of the reels wild in one embodiment. The remaining non-wild symbols are spun. The gaming device then pays the player for each winning symbol or symbol combination after the remaining reel(s) is spun. In one embodiment, a different number of paylines and/or slot machine symbols are used for the bonus spin.

While the present invention, in one embodiment is employed with a game of slot, it should be appreciated that the principles disclosure are applicable to other types of wagering games. For example, in a poker game that allows the player to wager a number of hands at once and allows the player to wager a different number of credits per hand, the gaming device applies the above described method and apparatus to those two wagering components. For example, a threshold number of hands wagered makes the player eligible to play or advance to a bonus game, while the wager per hand dictates how much the bonus meter advances if the player for example achieves jacks or better or some other predefined poker outcome. The present invention is likewise applicable to blackjack, wherein the player can play multiple hands at once and make a variable wager for each hand. The same holds true for keno, wherein the player can play multiple keno cards at once as well as wager a variable amount per each card.

It is therefore an advantage of the present invention to provide a fun and exciting bonus game triggering event.

It is another advantage of the present invention to provide bonus game play that is effected by a player's wager on each of a multiple number of wagering components.

It is still further an advantage of the present invention to provide a fun and exciting persistence type game.

Moreover, it is an advantage of the present invention to provide a fun and exciting bonus game display.

Additional features and advantages of the present invention are described in, and will be apparent from, the following Detailed Description of the Invention and the figures.

DETAILED DESCRIPTION

Figure 1A:
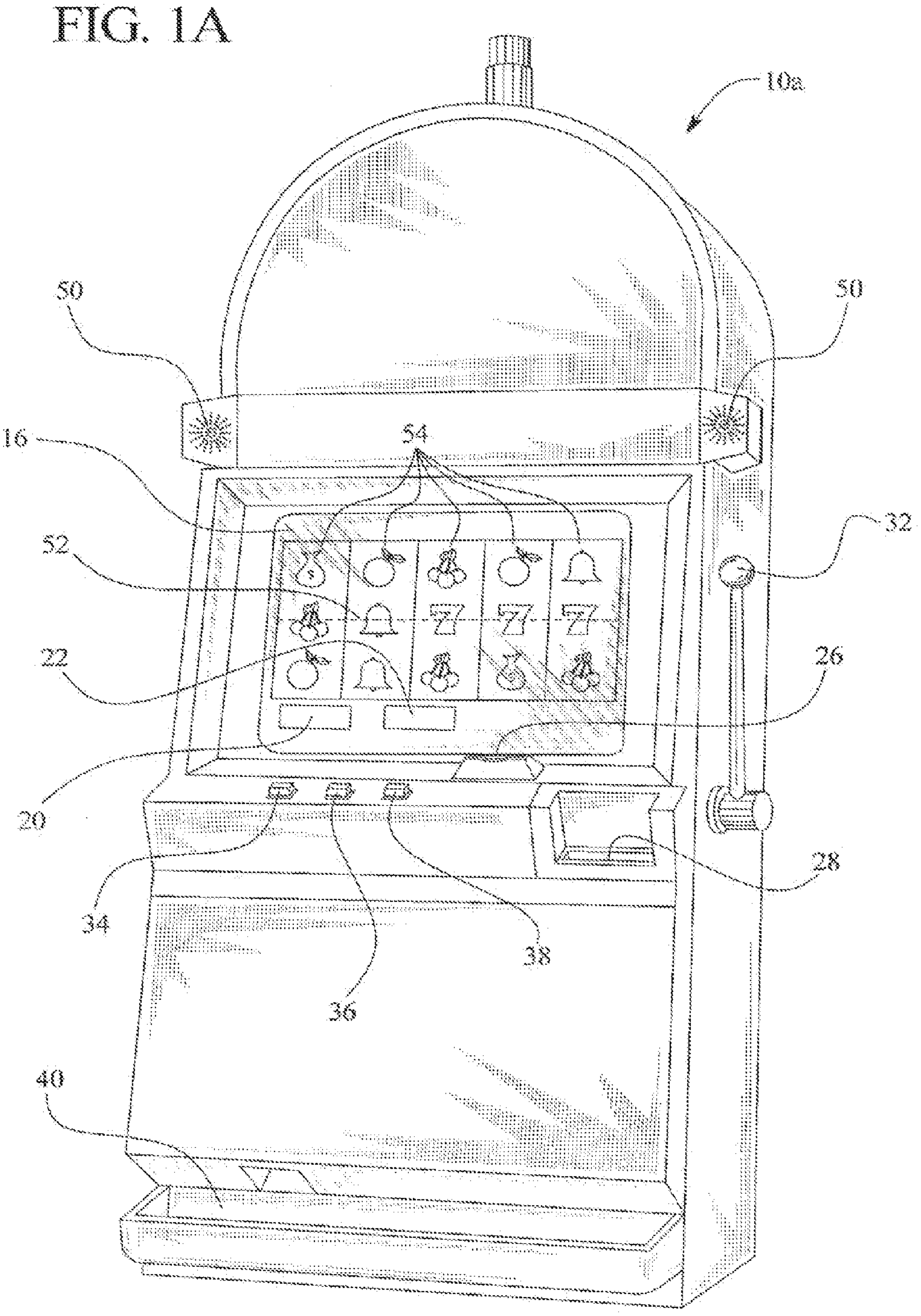
FIGS. 1A and 1B are front perspective views of various embodiments of a slot machine embodiment of the gaming device of the present invention.
Figure 1B:
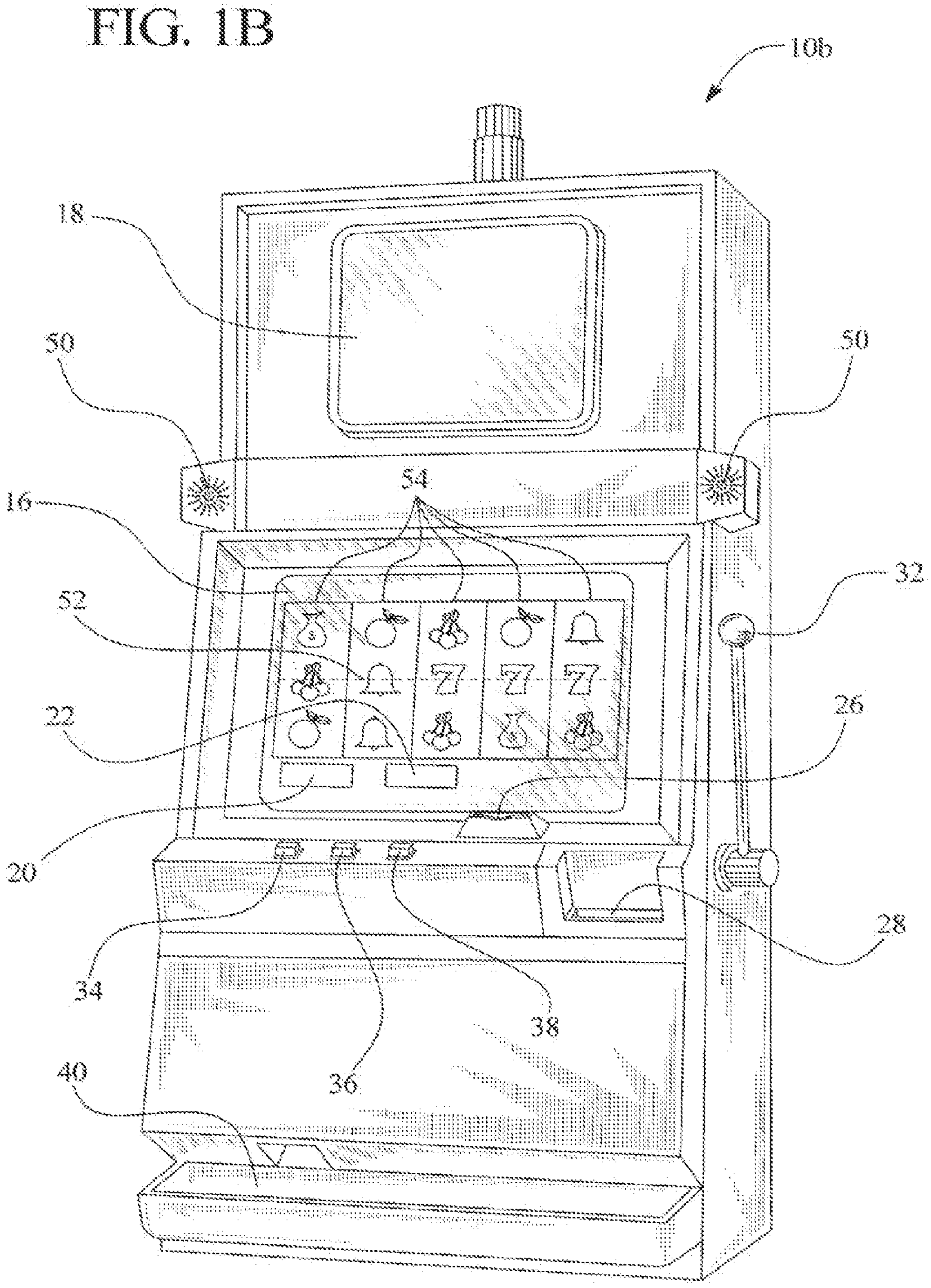

Referring now to the drawings, two alternative embodiments of the gaming device of the present invention are illustrated in FIGS. 1A and 1B as gaming device 10*a* and gaining device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
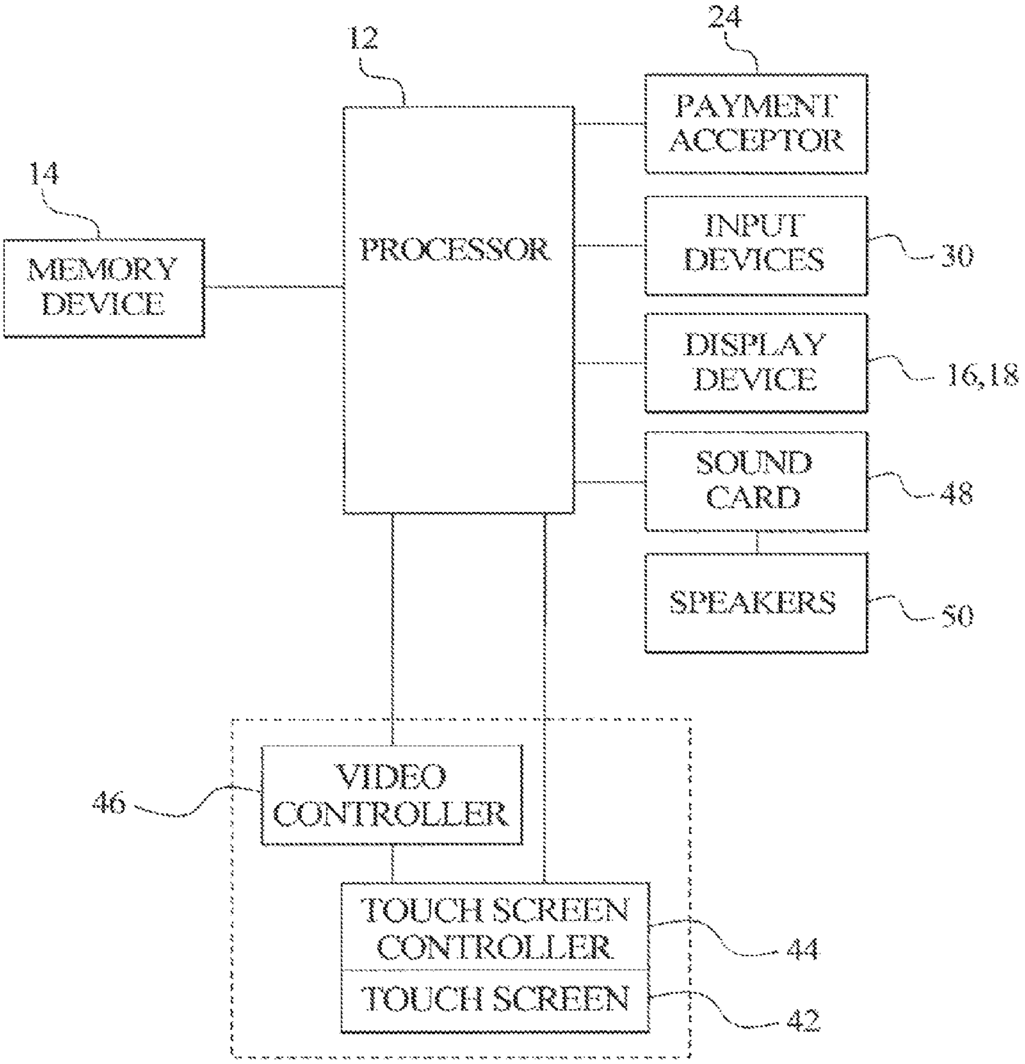
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which preferable moves one or more mechanical objects, such as one or more mechanical rotatable wheels, reels or dice, configured to display at least one and preferably a plurality of games or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal; angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
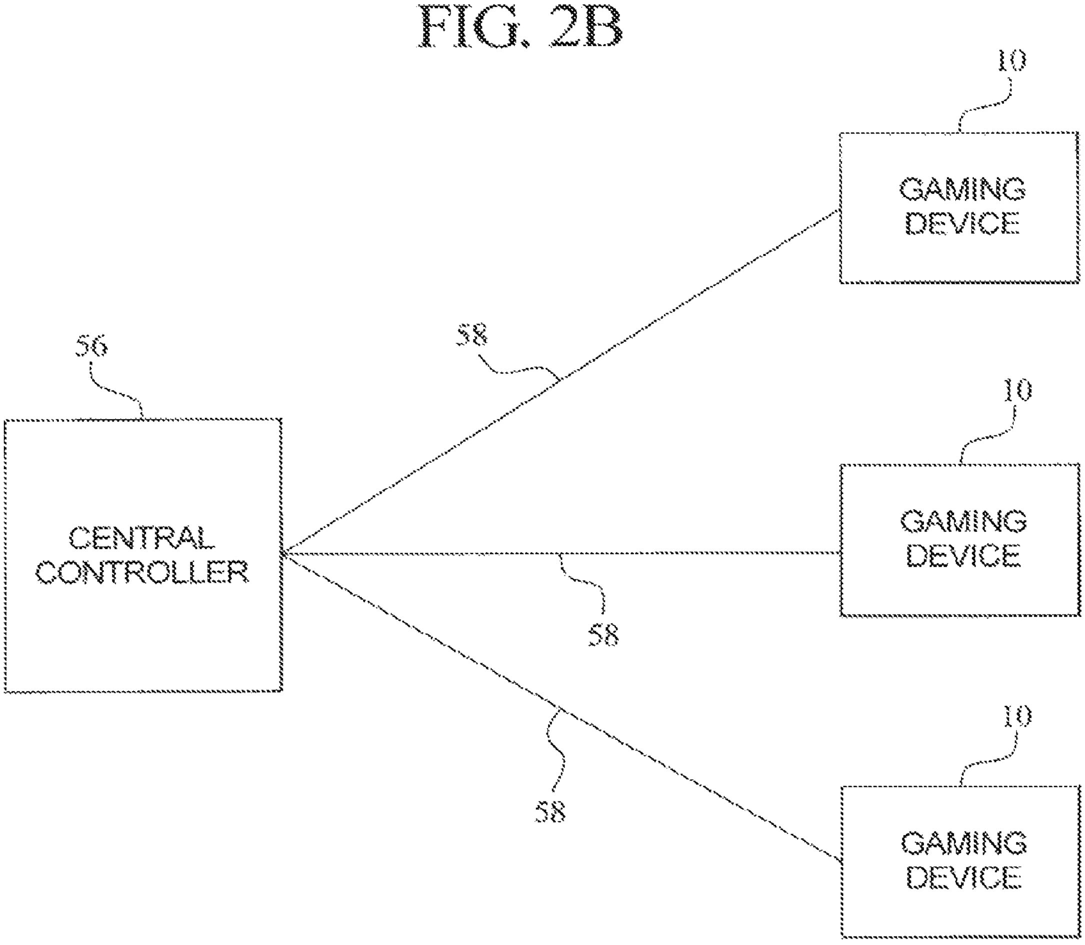
FIG. 2B is a schematic block diagram of various gaming devices employing the wagering game of the present invention, wherein the devices are networked to a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/'intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Bonus Game

Figure 3:
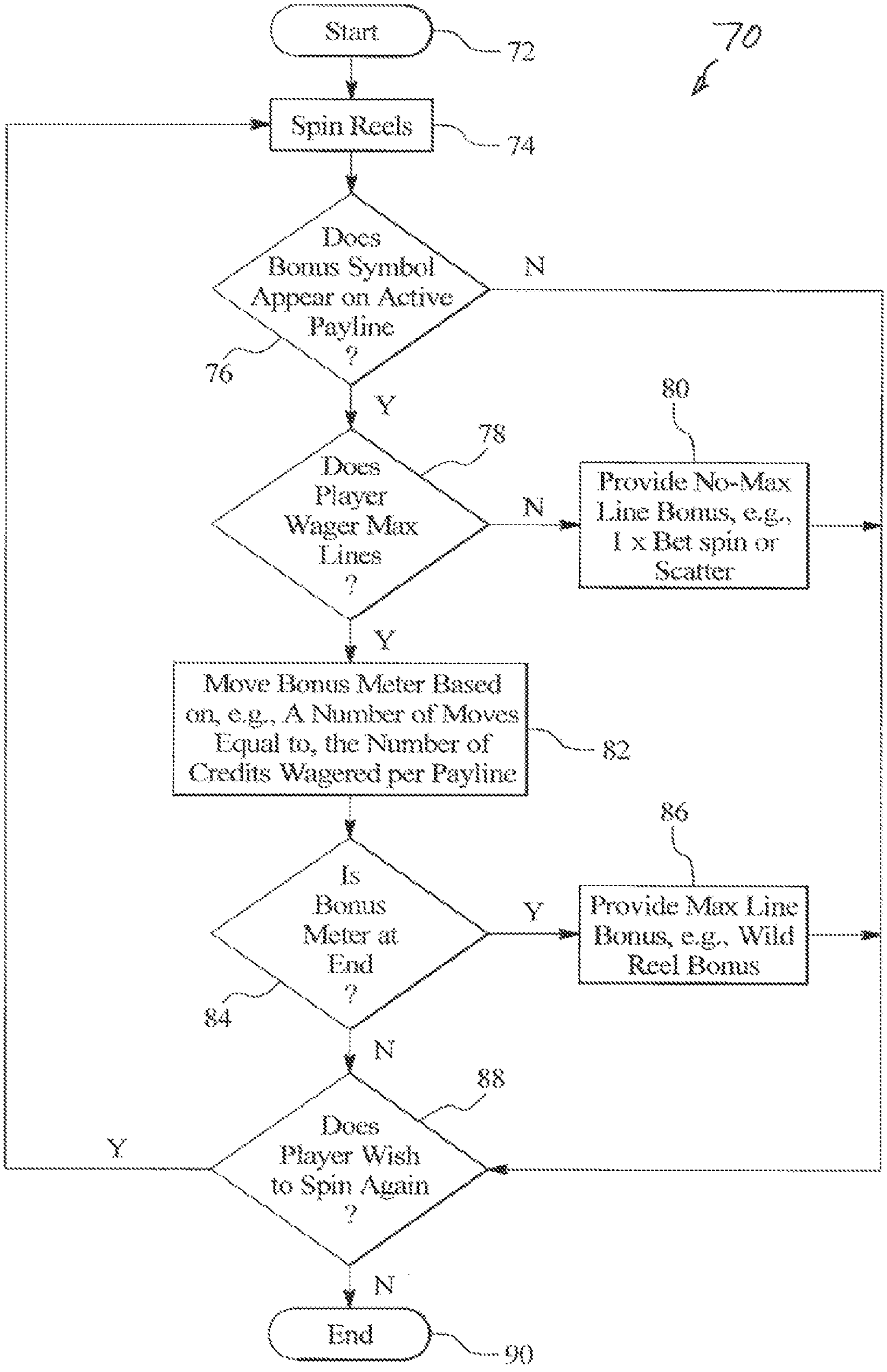
FIG. 3 is a schematic flow diagram of one embodiment of the bonus triggering apparatus and method of the present invention.

Referring now to FIG. 3, one possible sequence of operation for triggering and advancing a persistence meter of one embodiment of the present invention is illustrated by the method 70. It should be appreciated that the term "persistence" generally refers to a game having a meter or other type of counter that does not reset after each game or after the player cashes out. Such meters or changes to the meter move the player closer to winning an award.

While the sequences are described in connection with the method for the game of slot, it should also be appreciated that the methods and apparatuses described herein are applicable to any suitable wagering game having multiple wager components, such as slot, poker, blackjack and keno.

Upon starting the method 70 as indicated by oval 72, slot machine reels are spun as indicated by block 74. After the reels are spun, a determination is made whether a bonus symbol or symbol combination appears on an active payline, as indicated by diamond 76. In the embodiments illustrated in FIGS. 7 to 10, the bonus symbol is a single symbol appearing on the final or furthest right reel. In other embodiments, the bonus symbol can instead be a plurality of symbols that appear adjacent to one another or spread apart on non-adjacent reels. The one or more symbols can also appear on any of the reels as desired by the game implementor.

If the bonus symbol does not appear on an activate payline, the game then determines whether the player wishes to spin again, as indicated by diamond 88. If the player does not wish to spin again, the play of the gaming device 10 ends, as indicated by oval 90. If the player does wish to spin again, the reels are spun as indicated by block 74 and the process of method 70 is repeated.

If the bonus symbol or symbol combination appears on an active payline, the processor determines whether the player has wagered a maximum number of paylines, e.g., a max bet for a first wager component, as indicated by diamond 78. If the player has received the bonus symbol or symbol combination but has not wagered max lines, the game or gaming device can provide a "no-max line" bonus, as indicated by block 80. The "no-max line" bonus in various embodiments includes a straight pay of one time times bet, including any wins involving the trigger symbol. In another embodiment, the "no-max line" bonus is a scatter pay, which pays the player for any winning combinations appearing on the video monitor despite the fact that the player has not wagered all the paylines. After gaming device 10 provides the "no-max line" bonus, the determination of whether the player wishes to spin the reels again is made as indicated by diamond 88, with the outcomes of their decision as described above in connection with block 74 and oval 90.

If the player achieves the bonus symbol or symbol combination as indicated by diamond 76 and has wagered max lines as indicated by diamond 78, a persistent bonus meter is moved. In one embodiment, a meter shown in FIGS. 7 to 10 is decreased or decremented from 10 to 0. In one embodiment, the number of moves along the meter is based on the number of credits wagered per payline. In one embodiment, the number of moves along the meter is equal to the credits wagered per payline. It should be appreciated that any suitable relationship between the changing such as incrementing (or decrementing) meter and the second component may be employed.

Figure 4:
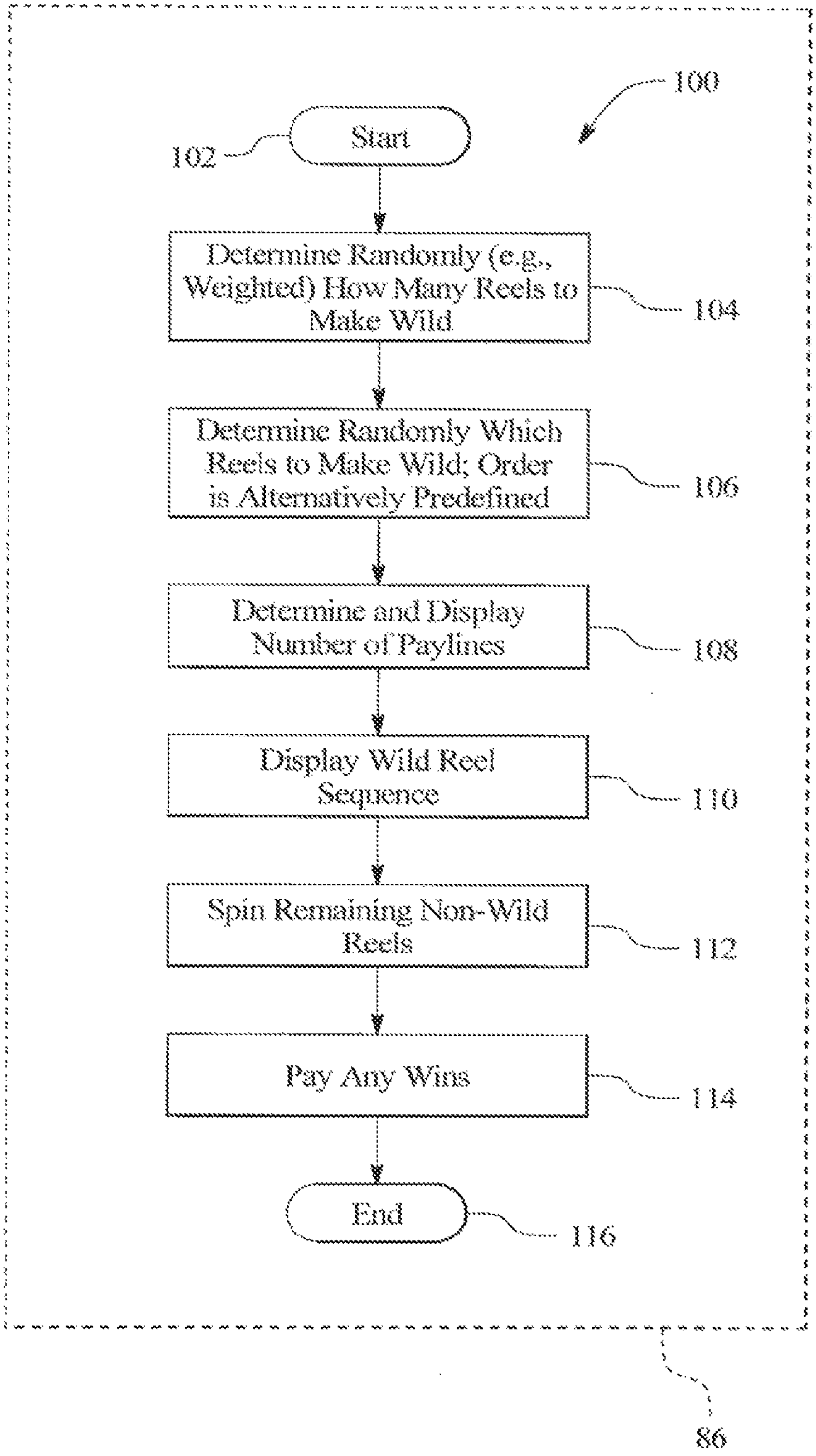
FIG. 4 is a schematic flow diagram of one embodiment for a bonus game of the present invention, which is indicated as a max line bonus in FIG. 3.

After the bonus meter is moved, if the bonus meter is at an end as indicated by diamond 84, gaming device 10 provides a max line bonus as indicated by block 86. One embodiment for the max line bonus game is illustrated in FIG. 4. In that game, a number of reels are made wild and at least one free spin of the reels or activation of the primary game is provided to the player. That game is described in more detail below in connection with FIG. 4. If the bonus meter does not reach the end after the number of moves as indicated by diamond 84 or if the max line bonus is provided to the player as indicated by block 86 the game or gaming device 10 determines whether the player wishes to spin the reels again as indicated by diamond 88. If not, the sequence 70 ends as indicated by oval 90. If the player does wish to spin the reels again, the sequence returns to the spin reels block 74 and the above described loop of method 70 is repeated.

While the method 70 is described in connection with the game of slot, as indicated above, it should be appreciated that the method is applicable to any game having multiple wagerable components. For example, known video poker machines enable the player to play multiple games or hands of poker at once and also to wager a variable amount on each of the hands played. The number of hands played and the wager per hand are each two variable wager components. In the method 70, the number of hands played can replace the number of lines played and the wager per hand can replace the wager per line.

In a similar manner, the game of blackjack allows the player to play multiple blackjack games at once and to wager a variable amount on the games played. Moreover, the game of keno allows the player to play multiple keno cards or games at one time and to vary the amount of the wager made per card or game. Those components can be substituted for number of paylines and wager per paylines in the method 70.

Figure 6:
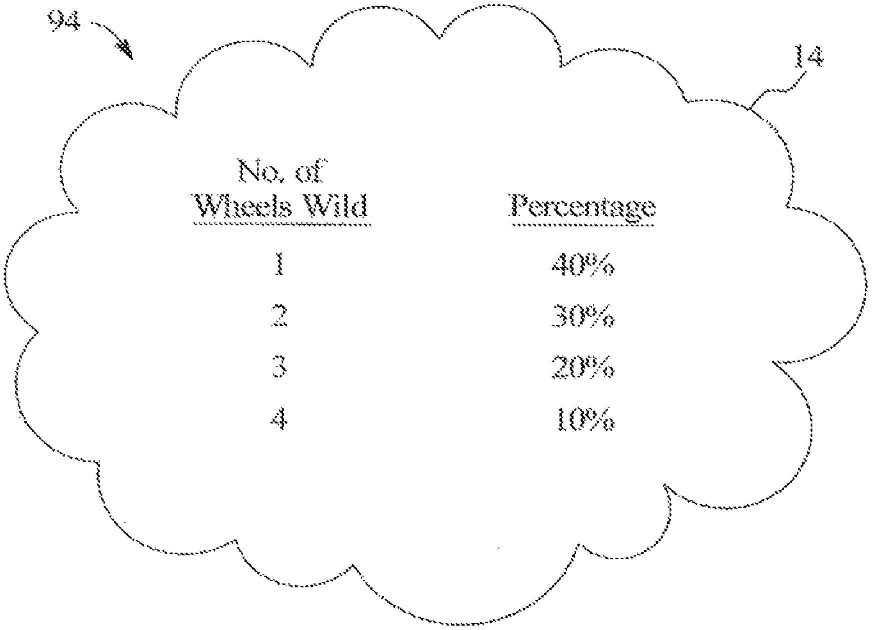
FIG. 6 is a schematic illustration of an area of memory showing a waging system for determining how many reels to make wild in a slot machine bonus game of the present invention.

Referring now to FIG. 4, a method 100 illustrates one embodiment of a bonus game that is provided to the player who wagers the threshold number of paylines, and who achieves the bonus symbol or symbol combination upon a random spin of the slot machine reels. Upon starting the method as indicated by oval 102, the game or gaming device determines randomly how many reels to make wild as indicated by block 104. An area 94 of memory device 14 diagrammatically shown in FIG. 6 is used in one embodiment to determine randomly how many reels to make wild. The area of memory contains a weighted table for making one reel wild, two reels wild, three reels wild and four reels wild. As illustrated, the likelihood of one reel being made wild is four times the likelihood that four reels are made wild. In alternative embodiments, the distribution is different as desired by the game implementor and in accordance with game mathematics.

After the gaming device determines how many reels to make wild, the gaming device determines randomly which reels to make wild, as indicated by block 106. That is, if for example there are three wild reels, the gaming device determines randomly which three reels are wild. For example, gaming device 10 could define reels 1, 3 and 5 as wild reels, or reels 3, 4 and 5 as wild reels. In an alternative embodiment, the order of the wild reels is predetermined. For example, if there are three wild reels, the gaming device can preorder that the 3, 4, and 5 reels will be wild. The order can be predetermined to be any suitable order desired by the game implementor. In an alternative embodiment, the reels can be spun to other designated symbols. In a further alternative embodiment, the reels can be spun to generate symbols on the reels, a first evaluation may be performed, and then one or more symbols can be added to the reels prior to a second evaluation.

After the number and placement of the wild reels is determined, as indicated by blocks 104 and 106, the game determines how many paylines to display in the bonus game as indicated by block 108. The number of paylines in the bonus game can be the same or different as the number of paylines used in base game play. Because the player is required to wager a threshold number of paylines, e.g., max lines, and advances along the bonus meter are based on the credits wagered per payline, the total number of credits needed to get to the bonus is the same regardless of how many credits the player wagers per payline. Therefore, the bonus game can provide as many paylines as desired and allow the player to obtain wins along any of the paylines, knowing that the game does not disproportionately favor the player who wagers less per payline.

The wild reel sequence is then displayed as indicated by block 110. In one embodiments, illustrated below in FIGS. 7 to 10, the wild reel sequence is displayed on one of the display devices 16 or 18. In general, the wild reel sequence places wild symbols in each of the symbols in each of the symbol positions of the reels. Next, gaming device 10 spins each of the reels that is not a wild reel at least one time to provide the player at least one free spin, as indicated by block 112.

The gaming device 10 pays any wins from the free spin as indicated by block 114 and the bonus ends as indicated by oval 116. Normal game play resumes thereafter as indicated by diamond 88 of FIG. 3, which follows the bonus game described in connection with block 86. While the method 100 describes one possible bonus sequence, other bonus sequences can be provided for the max line bonus indicated by block 86 in accordance with the present invention. For example, besides free spins, gaming device 10 can provide free games, a non-monitory bonus, a number of picks from a prize pool, a bonus yielding number of gaming device credits, a bonus yielding a gaming device multiplier and any combination of these.

Figure 5:
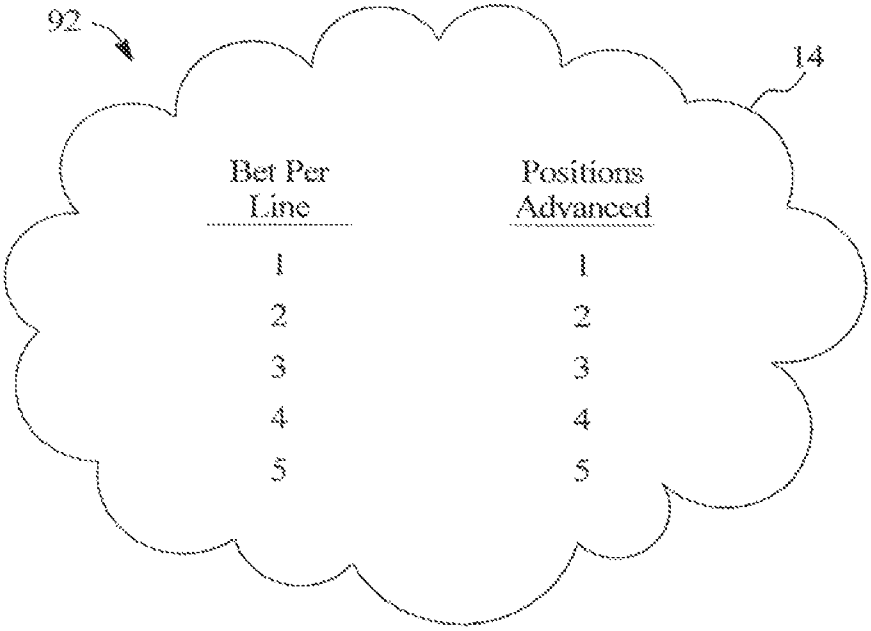
FIG. 5 is a schematic illustration of an area of memory containing a proportioning table relating the credits wagered per payline with a number incrementing or decrementing moves of a persistent bonus meter.
Figure 7:
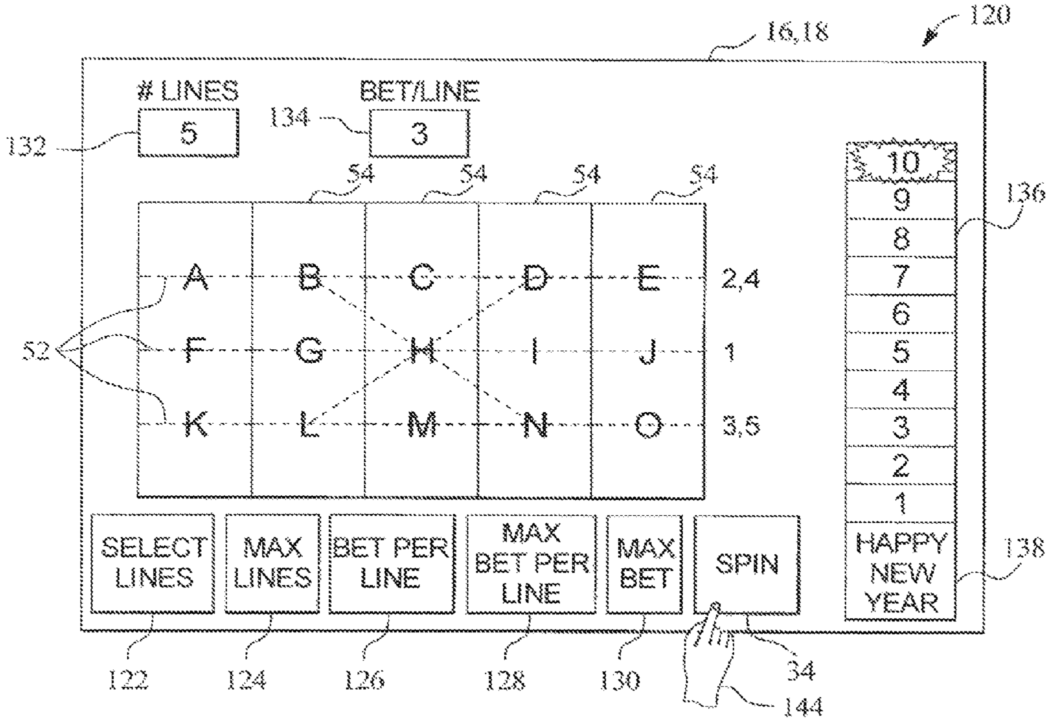
FIGS. 7, 8, 9 and 10 are screen sequences of a video monitor of a gaming device of the present invention showing one example of a bonus game play.

Referring now to FIGS. 7 to 10, one example of the methods 70 and 100 set forth in FIGS. 3 and 4 using the tables 92 and 94 in memory device 14 as shown in FIGS. 5 and 6 is illustrated. As seen in FIG. 7, a first screen sequence 120 is illustrated on one of the display devices 16 or 18. The reels show an arrangement of symbols A to O, which have been generated randomly from a paytable for gaming device 10. The particular symbol arrangement appears before the player causes any action of the reels 54. Gaming device 10 can have any number of paylines 52. In the illustrated embodiment, the base game provides five paylines 52, one to five.

Screen 120 also displays a number of selections to the player, which operate with touch-screen 42 to send inputs to processor 12. In particular, screen 120 as well as the other screens of FIGS. 8 to 10 include a select lines input 122, which enables the player to wager on any amount of one to five paylines. The screen 120 also includes a max lines input 124, which enables the player to set the paylines to five with one button press. Input device 126 increments the bet per line, typically from one to five credits. The max bet per line input 128 sets the wager per payline to the maximum with one button press. Max bet input 130 sets the paylines and the wager per payline to maximum with one button press. Spin button 34 as described above allows the player to spin the reels after the wager is made.

FIGS. 7 to 10 also illustrate a number of indicators that show the player how many lines are wagered 132 and the bet per payline 134. In FIG. 7, the player has selected to wager three credits per payline on five different lines, forming an overall bet of 15 credits.

The bonus game includes a meter 136. In the illustrated embodiment, the player's initial position is ten. If the player receives a bonus symbol or combination on one of the reels, gaming device 10 decreases or decrements the players position by the number of credits wagered per payline. In an alternative embodiment, the meter can be incremented or increased. The final or end position of meter 136 includes the indicia "Happy New Year." Meter 136 follows a theme of the gaming device, which is a New Years Day celebration that counts backwards from ten down to the final position, "Happy New Year".

Figure 8:
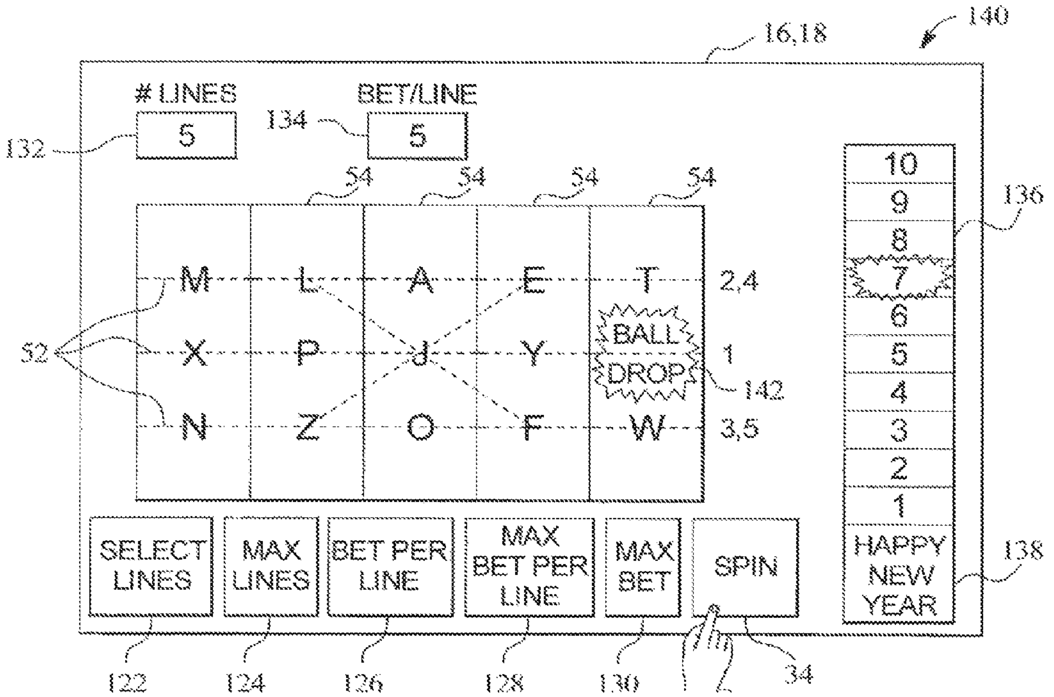

When the player presses the spin button 34 in the screen 120 of FIG. 7, the reels spin and stop and display a random (or other suitable.) arrangement of symbols on reels 54, as seen in the display 140 of FIG. 8. The reel spin has produced a bonus or "ball drop" symbol 142 on the fifth reel 54. In one embodiment, gaming device 10 produces a single bonus symbol along one or more reels. In another embodiment, gaming device 10 requires a bonus symbol combination, which can again occur on any desired number and percentage of reels.

In one embodiment, the bonus symbol 142 must appear on an active payline, which occurs in FIG. 8 because the player wagers all lines. If instead the ball drops symbol appears on a non-active payline or on a active payline when the player has not wagered max lines, gaming device 10 instead of decrementing meter 136 provides the player with a secondary award such as a one times bet pay or a scatter pay.

Because the player in screens 120 and 140 has wagered max lines and received bonus symbol 142, gaming device 10 decrements meter 136 by the previous bet per line, which in screen 120 is three credits. Meter 136 of screen 140 therefore shows that the player's current position on meter 136 has moved from the ten spot to the seventh position.

Figure 9:
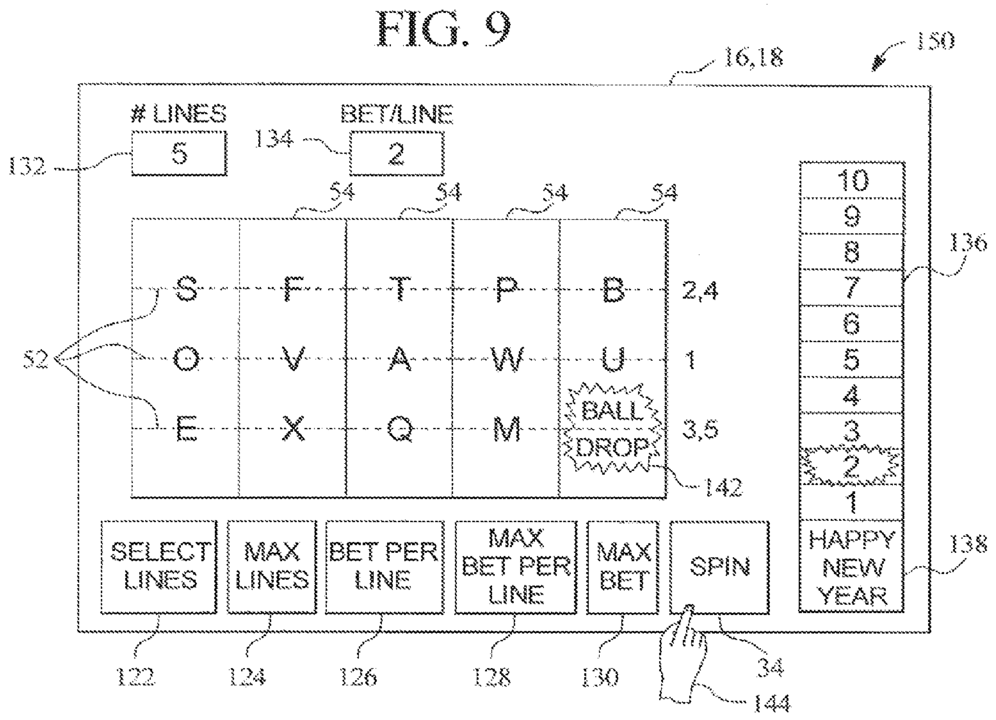

In screen 140, player 144 again hits spin button 34, which produces a random outcome of symbols on the reels 54 as shown on screen 150 of FIG. 9. the player again randomly receives the bonus symbol 142 along the fifth reel. In the illustrated embodiment, bonus symbol 142 only appears on the fifth reel. In other embodiments, the symbol appears on a different reel or on multiple reels. Because the player bet max lines in screen 140, meter 136 is decremented by the previous wager per payline, which in screen 140 is illustrated as five credits. Meter 136 in FIG. 9 accordingly shows the player's position change from the seventh spot to the second spot from last spot 138. It should be appreciated that during normal base game play of gaming device 10, the player achieves other awards according to a paytable of gaming device 10. If an amount the player wins exceeds an amount wagered, the player's credit meter 20 (illustrated in FIGS. 1A and 1B) shows an increase in total credits. If the amount the players wins does not exceed the total credits wagered per spin, the number of credits shown in the credit display 20 decreases.

In FIG. 9, the player knows that only two more position moves are needed to get to the bonus payout event. Therefore, the player, knowing the rules of the bonus game wagers two credits per payline, which is just enough to move the player to the bonus payout event upon the next generation of the bonus symbol 142, assuming the player wagers max lines player 144 than presses spin button 144. In an alternative embodiment, if more than two credits and wagered per payline, the extra credits will take the player to another bonus game or be employed to change the next meter after the bonus game.

Figure 10:
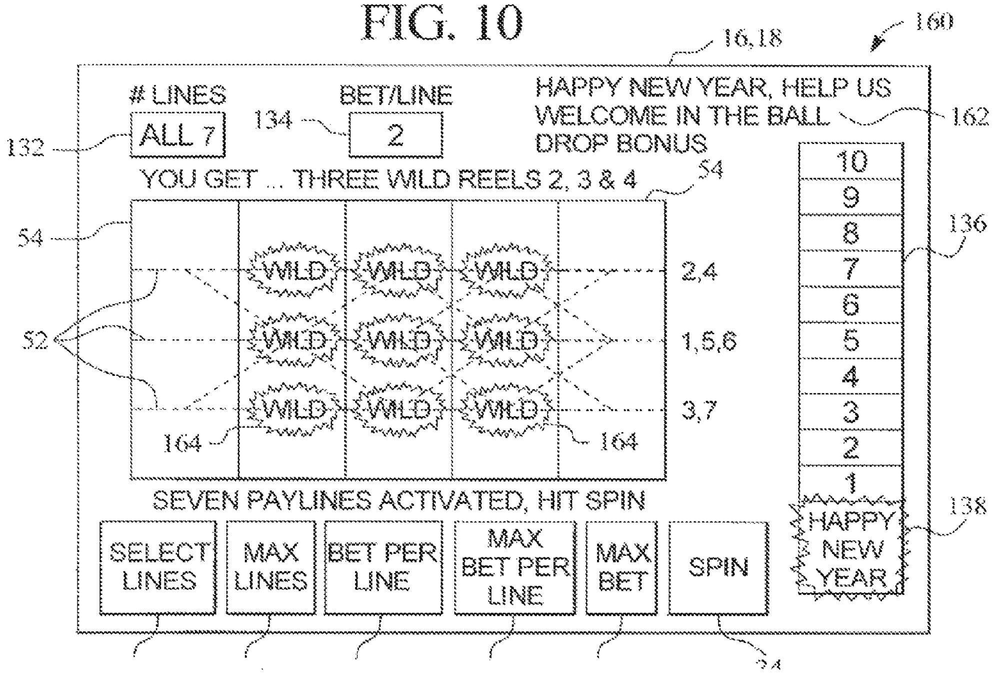

Screen 160 of FIG. 10 illustrates the bonus payout event, which occurs when the player's position on wager 136 reaches the end or Happy New Year position 138. Gaming device 10 provides an audio, visual or audio visual message 162 informing the player that the payout sequence is about to occur and that the player is to receive three wild reels 2, 3 and 4. That is, gaming device 10 according to table 94 of FIG. 6 randomly determines that the player should receive three wild reels. Gaming device 10 also either randomly determines or predetermines that the three reels will be reels 2, 3 and 4.

In one embodiment, gaming device 10 displays wild symbols 164 drop from the top of each wild reel to the bottom, leaving wild symbols 164 or grayed-out wild symbols 164 in each symbol position. In screen 160, therefore, nine of the fifteen symbols are wild. In one preferred embodiment, each wild symbol represents or stands in the place of each symbol of the paytable of gaming device 10 to create and award the player for each possible win from the paytable that includes in combination the main game reel symbols that appear on the first and fifth reels of FIG. 10.

The bonus payout event proceeds to spin the first and fifth reels to generate symbols thereon. Thereafter, any winning symbol or symbol combination created by the generated symbols on the first and fifth reels and the wild symbols 164 results in a credit award for the player. Also, meter 136 is reset to the beginning, e.g., the player's position is returned to the tenth position. As discussed above, it should be appreciated that the present invention contemplates a carryover of moves on the meter 136, wherein if a designated number of moves are obtained but not needed to reach or achieve the result of the meter, such portion not needed will be applied to a subsequent reset meter. This feature can be employed if a certain wager level is made in one embodiment.

In one embodiment, meter 136 is a "persistence" meter which does not return to a starting position when a player cashes out. For example, if the player cashes out after achieving the result in screen 140, the position on meter 136 does not return to the beginning or tenth position. Rather, the position on meter 136 remains unchanged, e.g., at the seventh position. In an alternative embodiment, the meter 136 is not a persistence meter and resets to the beginning of tenth position upon a player cashout.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of operating a gaming system, said method comprising:

causing at least one processor to operate with at least one display device and at least one input device to:

(a) display a base game and a meter associated with a base game, said meter being different than and in addition to any credit meter associated with the base game;

(b) receive from a player a selected wager from a plurality of different possible wagers on a play of the base game, said selected wager including:

(i) a player selected first component from a plurality of different first components; and (ii) a player selected different second component from a plurality of different second components, said selected wager having a total wager value;

(c) display the play of the base game including an outcome of the play of the base game;

(d) display any award resulting from the outcome of the play of the base game;

(e) display a change in the meter in association with the play of the base game if:

(i) the player selected first component for the play of the base game is at least a threshold amount, and (ii) the outcome of the play of the base game includes a designated outcome; and (f) when said meter reaches a designated level, display an award associated with the meter to the player.

2. The method of claim 1, wherein said change is of an amount determined based on the player selected different second component for the play of the base game, and is not based on the total wager value of the selected wager.

3. The method of claim 1, wherein the base game is a slot game, the player selected first component is a number of paylines wagered on, and the player selected different second component is a wager per payline.

4. The method of claim 1, wherein the base game is a slot game, the player selected different second component is a number of paylines wagered on, and the player selected first component is a wager per payline.

5. The method of claim 1, wherein the base game is a card game, the player selected first component is a quantity of hands wagered on, and the player selected different second component is a wager per hand.

6. The method of claim 1, wherein the base game is a card game, the player selected different second component is a quantity of hands wagered on, and the player selected first component is a wager per hand.

7. The method of claim 1, wherein the threshold amount for the player selected first component is a maximum amount of the first components.

8. The method of claim 1, wherein the designated outcome includes a designated symbol.

9. The method of claim 1, wherein the designated outcome includes a designated symbol combination.

10. The method of claim 1, which is provided through a data network.

11. The method of claim 10, wherein the data network is an internet.

12. A gaming system comprising:

at least one display device;

at least one input device;

at least one processor; and at least one memory device storing a plurality of instructions which, when executed by the at least one processor; cause the at least one processor to operate with the at least one display device and the at least one input device to:

(a) display a base game and a meter associated with a base game; said meter being different than and in addition to any credit meter associated with the base game;

(b) receive from a player a selected wager from a plurality of different possible wagers on a play of the base game; said selected wager including:

(i) a player selected first component from a plurality of different first components; and (ii) a player selected different second component from a plurality of different second components, said selected wager having a total wager value;

(c) display the play of the base game including an outcome of the play of the base gam (d) display any award resulting from the outcome of the play of the base game;

(e) display a change in the meter in association with the play of the base game if:

(i) the player selected first component for the play of the base game is at least a threshold amount, and (ii) the outcome of the play of the base game includes a designated outcome; and (f) when said meter reaches a designated level; display an award associated with the meter to the player.

13. The gaming system of claim 12, wherein said change is of an amount determined based on the player selected different second component for the play of the base game, and is not based on the total wager value of the selected wager.

14. The gaming system of claim 12, wherein the base game is a slot game, the player selected first component is a number of paylines wagered on, and the player selected different second component is a wager per payline.

15. The gaming system of claim 12, wherein the base game is a slot game, the player selected different second component is a number of paylines wagered on, and the player selected first component is a wager per payline.

16. The gaming system of claim 12, wherein the base game is a card game, the player selected first component is a quantity of hands wagered on, and the player selected different second component is a wager per hand.

17. The gaming system of claim 12, wherein the base game is a card game, the player selected different second component is a quantity of hands wagered on, and the player selected first component is a wager per hand.

18. The gaming system of claim 12, wherein the threshold amount or the player selected first component is a maximum amount of the first components.

19. The gaming system of claim 12, wherein the designated outcome includes a designated symbol.

20. The gaming system of claim 12, wherein the designated outcome includes a designated symbol combination.

* * * * *

UNITED STATES PATENT AND TRADEMARK OFFICE

CERTIFICATE OF CORRECTION

PATENT NO. : 9,022,853 B2
APPLICATION NO. : 13/848497
DATED : May 5, 2015
INVENTOR(S) : Anthony J. Baerlocher et al.

It is certified that error appears in the above-identified patent and that said Letters Patent is hereby corrected as shown below:

IN THE CLAIMS

In Claim 1, Column 17, Line 3, replace the third instance of "a" with --the--.
In Claim 12, Column 18, Line 5, replace ";" with --,--.
In Claim 12, Column 18, Line 8, replace the third instance of "a" with --the--.
In Claim 12, Column 18, Line 20, replace "gam" with --game;--.
In Claim 12, Column 18, Line 29, replace ":" with --,--.

Signed and Sealed this
Twelfth Day of April, 2016

*Michelle K. Lee*

Michelle K. Lee
*Director of the United States Patent and Trademark Office*